US009460222B2

(12) United States Patent
Gutkin et al.

(10) Patent No.: US 9,460,222 B2
(45) Date of Patent: Oct. 4, 2016

(54) SYSTEM FOR REWRITING DYNAMICALLY GENERATED UNIFORM RESOURCE LOCATORS IN PROXIED HYPER TEXT MARKUP LANGUAGE CONTENT IN ACCORDANCE WITH PROXY SERVER RULES

(75) Inventors: Greg Gutkin, San Francisco, CA (US); John Grundback, San Francisco, CA (US); Sriram Melkote, Bangalore (IN); Artem Stemkovski, San Francisco, CA (US); Tim Lake, San Francisco, CA (US); Joseph A. Stanko, El Cerrito, CA (US)

(73) Assignee: Oracle International Corporation, Redwood Shores, CA (US)

( * ) Notice: Subject to any disclaimer, the term of this patent is extended or adjusted under 35 U.S.C. 154(b) by 381 days.

(21) Appl. No.: 13/474,709

(22) Filed: May 17, 2012

(65) Prior Publication Data

US 2013/0311863 A1    Nov. 21, 2013

(51) Int. Cl.
*G06F 17/30* (2006.01)
*G06F 15/173* (2006.01)

(52) U.S. Cl.
CPC .............................. *G06F 17/30887* (2013.01)

(58) Field of Classification Search
CPC .................. G06F 17/30861; G06F 17/30876; G06F 17/3089; G06F 17/30899; G06F 17/30896; G06F 17/30893; G06F 17/30887
USPC .................................. 715/208, 738, 744, 760
See application file for complete search history.

(56) References Cited

U.S. PATENT DOCUMENTS

| | | | |
|---|---|---|---|
| 7,464,381 B1 | 12/2008 | Nickerson et al. | |
| 7,818,435 B1* | 10/2010 | Jellinek ............. | G06F 17/30902 709/203 |
| 2004/0230820 A1* | 11/2004 | Hui Hsu et al. ............... | 713/200 |
| 2006/0265427 A1* | 11/2006 | Cohen et al. .................. | 707/200 |
| 2008/0077809 A1* | 3/2008 | Hayler ................ | G06F 12/1466 713/193 |
| 2008/0250388 A1* | 10/2008 | Meyer et al. .................. | 717/106 |
| 2009/0119363 A1* | 5/2009 | Suzuki .......................... | 709/203 |
| 2012/0023160 A1* | 1/2012 | Marmor ........................ | 709/203 |
| 2012/0324113 A1* | 12/2012 | Prince et al. ................. | 709/226 |

* cited by examiner

*Primary Examiner* — Scott Baderman
*Assistant Examiner* — Hassan Mrabi
(74) *Attorney, Agent, or Firm* — Trellis IP Law Group, PC

(57) ABSTRACT

A system and method for facilitating changing a link generated by a script provided in proxied content. The example method includes identifying a link-producing script in proxied content; applying a wrapper function to the link-producing script; and employing the wrapper function to rewrite one or more links output by the link-producing script. In a specific embodiment, the proxied content includes Hypertext Transfer Protocol Language (HTML) markup. The link-producing script is implemented via JavaScript, and one or more links output via the link-producing script includes one or more Uniform Resource Locators (URLs).

10 Claims, 5 Drawing Sheets

SYSTEM FOR REWRITING DYNAMICALLY GENERATED UNIFORM RESOURCE LOCATORS IN PROXIED HYPER TEXT MARKUP LANGUAGE CONTENT IN ACCORDANCE WITH PROXY SERVER RULES

BACKGROUND

The present application relates to software, and more specifically to software for facilitating proxy operations in computer networks.

Proxy software is employed in various demanding applications, including content filtering, censoring, anonymizing, tracking, implementing gateways, and so on. Such applications often demand efficient mechanisms for accurately and consistently translating communications between a client and a content server via an intermediate proxy.

A proxy, such as a proxy server, may be any communication intermediary between a client and a server from which the client requests content. For example, a client may connect to a proxy server to request content, such as a service, file, connection, web page, or other resource from a content server. The proxy server evaluates the client request according to predetermined rules, such as filtering, censoring, or tracking rules. The proxy server then selectively provides requested content to the client in accordance with the predetermined rules.

When relaying HyperText Markup Language (HTML) content, such as a webpage, between a client and content server, certain Uniform Resource Locator (URL) links and associated resources must be adjusted or translated to function as intended. The adjusted or translated links are said to be rewritten relative to proxy. However, certain URL links (also called hyperlinks) and resources may not be present in the HTML markup offered by a content server. For example, the HTML markup may contain embedded URL-generating scripts to be run on a client browser.

Conventionally, dynamically generated hyperlinks output by the URL-generating scripts bypass proxy server hyperlink adjustments or translations. Hence, such dynamically generated hyperlinks may become inoperable when proxied using conventional link rewriting mechanisms.

SUMMARY

An example method facilitates rewriting or otherwise changing a link generated by a script provided in proxied content. The example method includes identifying a link-producing script in proxied content; applying a wrapper function to the link-producing script; and employing the wrapper function to facilitate changing one or more links included in dynamic content that is output by the link-producing script.

In a specific embodiment, the proxied content includes Hypertext Transfer Protocol Language (HTML) markup. The link-producing script is implemented via JavaScript, and one or more links output via the link-producing script include one or more Uniform Resource Locators (URLs).

The specific embodiment further includes receiving a request for proxied content, such as a pagelet, from a client browser and mapping the request to a URL associated with a content server. Markup corresponding to the proxied content and identified by the client request is retrieved by a proxy server from a content server, also called the remote server. Software running on the proxy server is adapted to parse or transform the markup in accordance with rules specified via the proxy server, and then provide the transformed markup to the client browser. Transformation of the markup includes, but is not limited to, applying a wrapper function to any URLs existing in a script included in the markup, and applying a wrapper function to any JavaScript expressions that make calls to JavaScript functions (e.g., document.write( . . . )) that produce dynamically generated content. The dynamically generated content may include one or more dynamically generated URLs.

The method further includes executing the wrapper function and the one or more link-producing scripts to yield one or more dynamically generated links in response thereto. The one or more link-producing scripts and accompanying wrapper function may be executed on a client computer running the client browser. The one or more dynamically generated links are rewritten to work properly with the proxy server, i.e., they are rewritten relative to proxy.

Rewriting of the one or more dynamically generated links may occur on a client computer or on the proxy server, or a combination of both, depending upon the implementation. When employing server-side dynamic link rewriting, dynamically generated content (output from a link-producing script), which includes the one or more dynamically generated links, is forwarded to the proxy server for rewriting of dynamically generated links therein. This is called the RESTful approach. Rewritten links are then forwarded from the proxy server back to the client computer for use by the client browser.

Transformation of the proxied content may further include identifying any static URLs occurring in the proxied content and rewriting the static URLs to facilitate transfer of content associated with the static URLs between a content server and the client via the proxy server.

Hence, certain embodiments discussed herein facilitate rewriting URLs, such as dynamically generated URLs, that might not be found by conventional URL parsing mechanisms, thereby limiting circumvention of the proxy server and reducing the likelihood of nonfunctioning or otherwise improperly proxied links.

As web pages increasingly employ dynamic HTML and/or content generated via client-side scripting languages, the need for efficient mechanisms, as presented herein, for correctly proxying such dynamic content and links generated thereby increases.

A further understanding of the nature and the advantages of particular embodiments disclosed herein may be realized by reference of the remaining portions of the specification and the attached drawings.

DETAILED DESCRIPTION OF EMBODIMENTS

Figure 1:
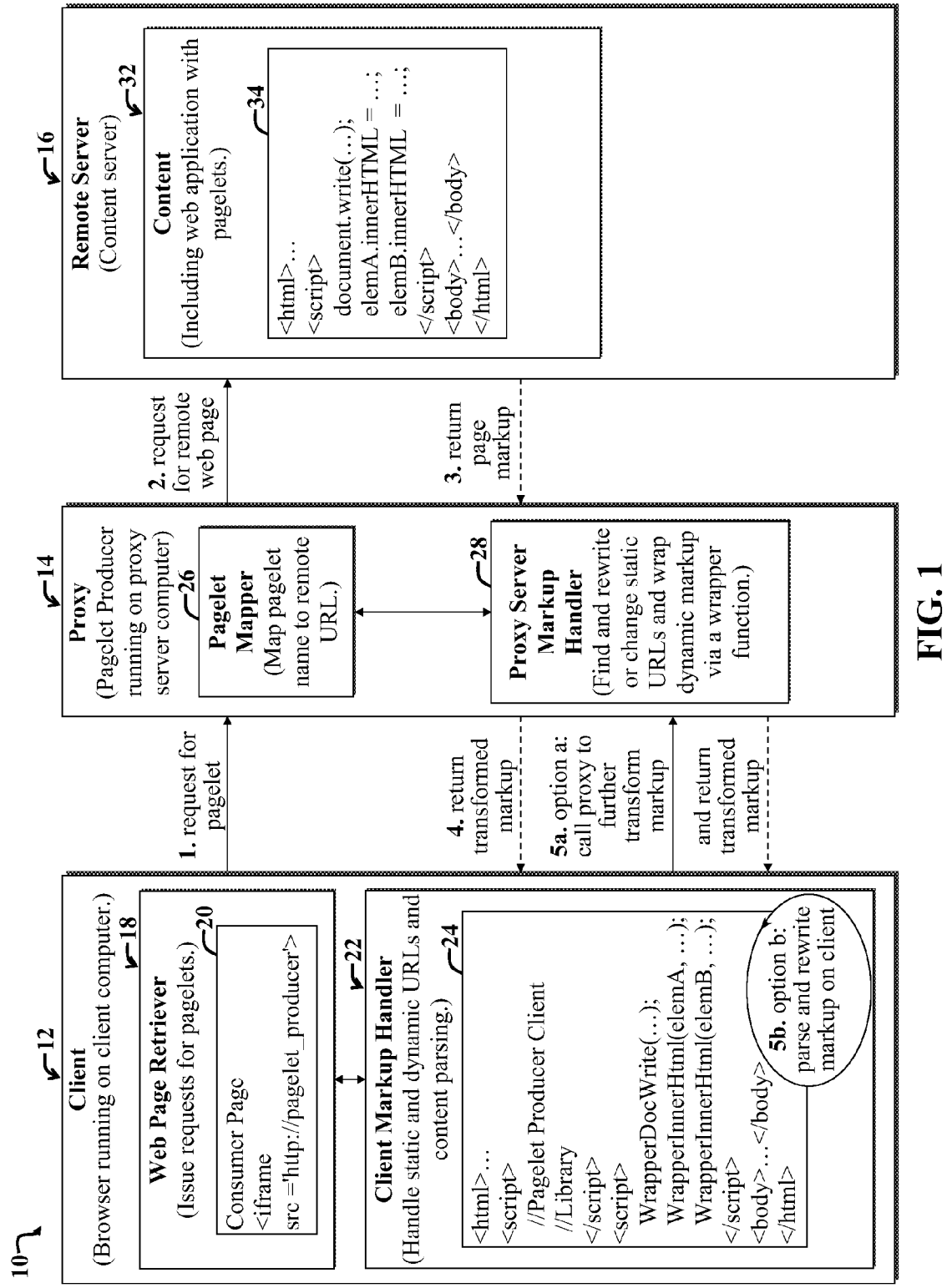
FIG. 1 is a diagram illustrating a first example system for detecting static and dynamic URLs and selectively changing them to facilitate proxy operations between a client and a remote content server.

Although the description has been described with respect to particular embodiments thereof, these particular embodiments are merely illustrative, and not restrictive.

For example, while the present application is discussed with respect to web-based proxies that facilitate transfer of pagelets containing link-producing JavaScripts between a remote server (i.e., content server) and a client via a proxy, embodiments are not limited thereto. For example, web proxying operations involving relaying content other than pagelets, wherein the content includes link-generating computer code other than JavaScript, may handle dynamically generated links as discussed herein, without departing from the scope of the present teachings.

For the purposes of the present discussion, a link (such as a hyperlink) may be any reference to or specification of a location of content in a computer network. The specification of a location may include an address associated with the content, such as a HyperText Transfer Protocol (HTTP) address, called a Uniform Resource Locator (URL). A URL may be a specific type of link characterized by a text string that references an Internet resource.

A script may be any computer program, or component, function, or procedure thereof adapted to perform one or more tasks. A link-producing script may be any script that is adapted to output a link, such as a URL. For example, a script (e.g., a JavaScript document.write( . . . ) script) that outputs content (e.g., markup) that includes one or more links, represents a type of link-producing script, also called a link-generating script. Similarly, a script that includes one or more function calls to a link-producing script is also is considered to be a link-producing script.

Certain scripts may be executed via a browser, which may run on a computer that is separate from a content server that hosts content that includes the script. Such a browser is called a client browser. A client browser may be any browser software running on a client computer or system. A browser may be any software adapted to access and/or traverse content available via a computer network, such as an enterprise network and/or the World Wide Web. A client may be any computer or system that is adapted to receive content from another computer or system, called a server.

A content server may be any server that is adapted to provide a resource, e.g., data or functionality, to a client. A remote server may be any content server in communication with a client via a proxy server. A proxy, such as a proxy server, may be any communication intermediary between a client and a content server.

Content that is generated via a script is called dynamic content. Links occurring in the dynamic content, which have been generated via the script, are called dynamically generated links. The script that produces the dynamically generated links is a content-generating script that is also a link-producing script. Hence, a dynamically generated URL may be any URL that is output from or otherwise determined by a script, called a link-producing script or a URL-generating script.

Content may be any resource, which may include data and/or functionality, such as a web page, file, streaming audio and/or video, and so on. Proxied content may be any content that is provided to a consuming resource, such as computer and/or program, via an intermediate proxy. The consuming computer and/or program (or collection thereof) is called the client. A server may be any computing resource, such as a computer and/or software that is adapted to provide content to another computing resource or entity that requests it, i.e., the client.

Hypertext may be any text or content with one or more elements that are associated with hyperlinks. The elements may include, for example, image maps or text that point to the location or address associated with the hyperlink, such that when a user selects an image map or hyperlinked text, the content associated with the specified location or address may be presented via a user interface. In certain contexts, the term "hyperlink" may also refer to the user interface control (e.g., image map, hyperlinked text, etc.) associated with the specified location or address. However, as the term is used herein, a hyperlink refers to a URL associated with the user interface control.

For clarity, certain well-known components, such as hard drives, processors, operating systems, power supplies, Internet Service Providers (ISPs), and so on, have been omitted from the figures. However, those skilled in the art with access to the present teachings will know which components to implement and how to implement them to meet the needs of a given implementation.

FIG. 1 is a diagram illustrating a first example system 10 for detecting static and dynamic URLs and selectively changing them to facilitate proxy operations between a client 12 and a remote content server 16, also simply called a remote server or content server.

The example system 10 includes a proxy server 14 (which may be implemented as a pagelet producer), which acts as a communication intermediary between a browser client 12 and a remote server 16. The proxy server 14 includes a pagelet mapper 26 in communication with a proxy server markup handler 28. The browser client 12 includes a web page retriever 18, which may include a browser user interface for rendering and displaying a consumer page 20 and for sending requests for content to the remote server 16 via the pagelet mapper 26 of the proxy server 14. The browser client 12 further includes a client markup handler 22, which communicates with the web page retriever 18 and which may communicate with the proxy server markup handler 28 of the proxy server 14.

The client markup handler 22 is adapted to selectively rewrite static URLs (that have not already been rewritten by the proxy server markup handler 28) existing in transformed markup obtained from the proxy server markup handler 28; to execute link-producing scripts; and to either rewrite dynamically generated content or to issue a request to the proxy server markup handler 28 to rewrite and return the dynamically generated content, as discussed more fully below.

For the purposes of the present discussion, a URL or link is said to be rewritten if it is adjusted, replaced, or otherwise modified. For example, when adjusting a URL that points to a content server to be a relative URL (relative to the proxy server 14), the adjusted URL is said to be rewritten.

Markup may be any content and associated syntax specified via a markup language. A markup language, such as HTML, may be any system or specification for prescribing how content is to be presented via a user interface, such as a browser user interface. Markup syntax may be any instructions or computer code included as part of a markup language.

The remote server 16 includes content 32, which may include one or more link-producing scripts 34 adapted to be run via a browser engine to yield dynamically generated content (markup) with dynamically generated links.

In an example operative scenario, the web page retriever 18 issues a request for a pagelet, where the request is sent to the pagelet mapper 26 of the proxy server 14. For the purposes of the present discussion, a pagelet may be any section of a webpage. Certain pagelets may be included within frames (e.g., within IFRAME HTML tags) or otherwise embedded directly into web page markup without using frames.

The pagelet mapper 26 includes computer code for mapping the requested pagelet to a remote URL corresponding to the pagelet address on the remote server 16. The remote server 16 includes machine readable instructions, i.e., computer code, for returning requested content 32 identified by the remote URL to the proxy server 14.

The requested content 32 received by the proxy server 14 is analyzed for the existence of static URLs and link-producing scripts. The proxy server markup handler 28 includes computer code for rewriting or otherwise changing the static URLs in accordance with predetermined proxy server rules. The predetermined proxy server rules are implementation specific and may vary depending upon the application. The rules may include, for example, adjusting URLs to point to a particular web address associated with the proxy server 14 and/or adding additional strings to facilitate tracking resources requested by the client browser 12.

The proxy server markup handler 28 analysis of the returned markup from the remote server 16 includes analyzing proxied content for existence of a document.write JavaScript statement (e.g., "document.write( . . . );") included within HTML script tags (e.g., <script> . . . </script>). For the purposes of the present discussion, a document.write Java Script statement may be any programming language statement or expression that calls a document.write Java Script function.

Analysis of the proxied content, i.e., returned markup from the remote server 16, further includes analyzing proxied content for existence of an innerHTML JavaScript statement. An innerHTML Java Script statement (e.g., "*.innerHTML= . . . ;") may be any programming language statement that calls a class, method or function, and/or other computing object whose name includes "innerHTML."

The wrapper function may include computer code for replacing one or more calls to one or more document.write JavaScript functions in the proxied content with a call to a first component of the wrapper function (e.g., "WrapperDocWrite( . . . );"). Computer code defining the first component may be included in a code library (e.g., "//Library" and "//Pagelet Producer Client) specified via the wrapper function, as shown in the transformed markup 24 on the client browser 12. Similarly, the innerHTML Java Script statements (e.g., "*.innerHTML= . . . ;") in the proxied content 32 may be replaced with calls to a second component of the wrapper function (e.g., "WrapperInnerHtml(*, . . . );"). Computer code for facilitating implementing the second component of the wrapper function may also be included in one or more of the code libraries (e.g., "//Library" and "//Pagelet Producer Client") specified via the wrapper function.

Hence, the proxy server markup handler 28 includes computer code for applying a wrapper function to each detected link-generating script. For the purposes of the present discussion, a wrapper function may be any computer code, e.g., software program, adapted to alter and/or augment another script or function.

In the present example embodiment, the wrapper function applied to a link-generating script before transfer of the wrapped script to the client browser 12 is adapted to encapsulate the link-generating script to facilitate capturing links output by the link-generating script and to facilitate rewriting captured scripts in accordance with predetermined proxy server rules. The wrapper function may first allow the link-generating script to run normally (to potentially create a URL) on a client browser; then parse the output of the link-generating script and rewrite any URLs as required to function in accordance with the proxy server rules. The parsed output may be placed onto the client browser page 20, so that it appears as it originally would have before the introduction of the wrapper function.

Exact details of the wrapper function are implementation specific and may vary accordingly. Those skilled in the art with access to the present teachings may readily determine appropriate details and implement a wrapper function to meet the needs of a given implementation without undue experimentation.

The example operative scenario further includes returning transformed, i.e., parsed markup, which includes rewritten static URLs and any wrapped link-generating scripts, to the client browser 12. The client markup handler 22 of the client browser 12 receives the transformed content from the proxy server markup handler 28 and executes any wrapped link-producing scripts in the transformed markup as needed to output dynamically generated markup and accompanying dynamically generated URLs.

The example operative scenario may involve implementing a first server-side processing option, which includes sending markup output by a link-producing script (e.g., a Java Script document.write script) to the proxy server markup handler 28 to be parsed and the dynamically generated URLs therein to be rewritten in accordance with proxy server rules.

A second client-side processing option includes employing the wrapper function associated with each link-producing script to parse and rewrite dynamically generated content, including any dynamically generated URLs therein in accordance with proxy server rules specified via the wrapper function. The second client-side processing option involves performing parsing and markup rewriting operations on the client browser computer 12.

In summary, the remote server 16 responds to client initiated content requests forwarded through the proxy server 14 with markup that is returned to the proxy server 14. The proxy server 14 employs the proxy server markup handler 28 to parse the markup and look for URLs; for URLs occurring within scripts (e.g., within HTML script tags); and for JavaScript function calls (occurring within HTML script tags) that may produce dynamic content with dynamically generated URLs therein. The proxy server markup handler 28 then wraps static URLs in the markup, wraps URLs within scripts, and wraps JavaScript expressions that may produce dynamically generated content with dynamically generated URLs. The wrapped URLs and expressions are then forwarded to the client 12. Subsequently, the client markup handler 22 may optionally (via a first option) employ the applied wrapper functions to rewrite URLs directly on the client 12, or may optionally (via a second option) implement a RESTful call to the proxy server 14 to parse dynamically generated content; rewrite URLs therein; and return rewritten URLs back to the client 12 for further use.

Embodiments that implement only the first server-side processing option, the second client-side processing option, or a combination of both are possible.

Figure 2:
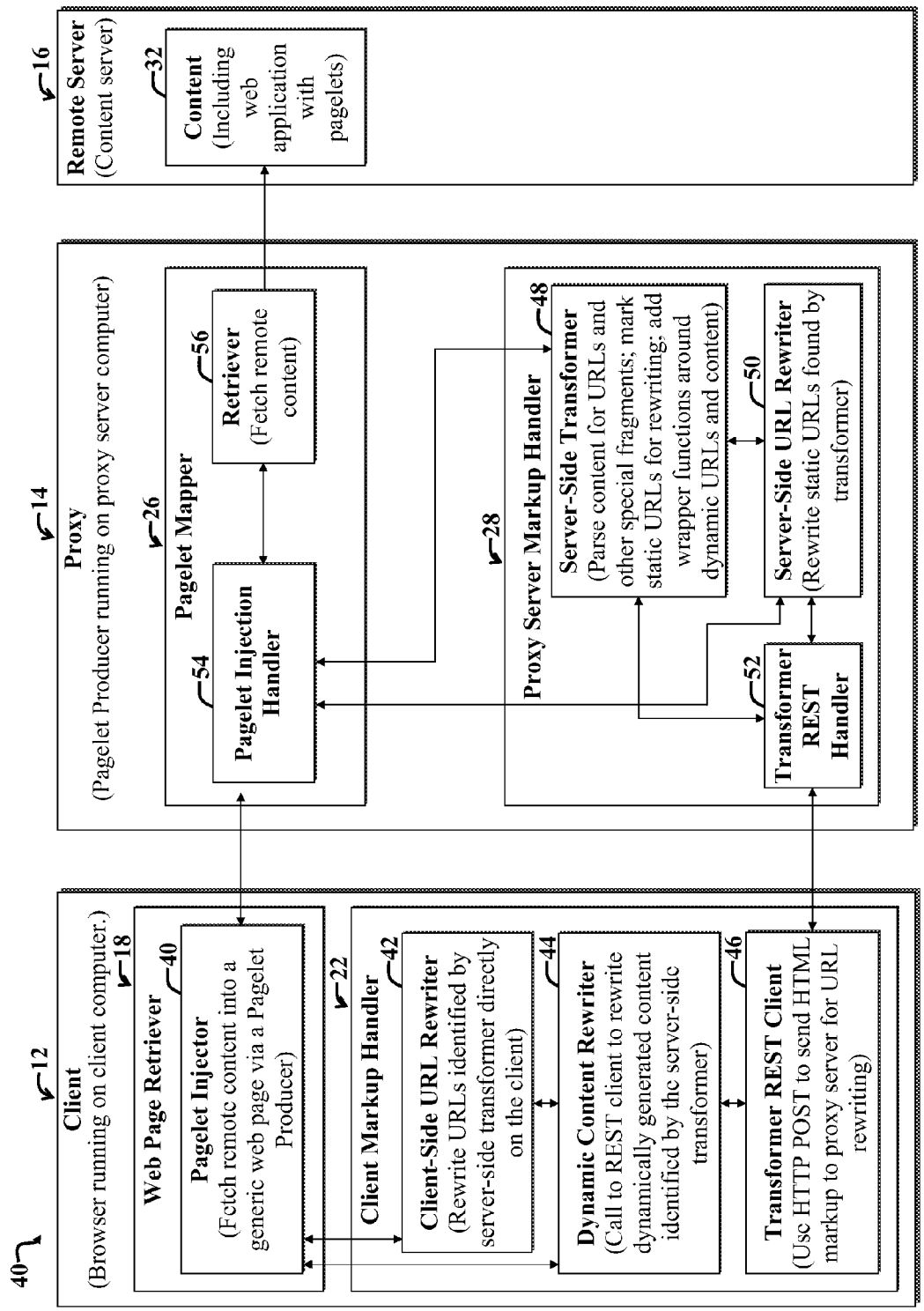
FIG. 2 is a more detailed diagram illustrating key functional blocks of a second example system employing server-side rewriting of dynamically generated URLs.

FIG. 2 is a more detailed diagram illustrating key functional blocks of a second example system 40 employing server-side rewriting of dynamically generated URLs. The second example system 40 represents a particular implementation of the system 10 of FIG. 1. The overall operation of the system 40 is similar to the overall operation of the system 10 of FIG. 1, but the system 40 implements a first processing option (e.g., option 5a as shown in FIG. 1), i.e., the RESTful approach. In the system 40 of FIG. 2, rewriting of dynamically generated URLs, which are generated via link-generating scripts running on the client browser 12, are passed back to the proxy server 14 (along with dynamically generated markup) for rewriting.

The web page retriever 18 includes a pagelet injector 40, which includes code for initiating fetching of remote content (e.g., content 32 from the remote server 32), also called proxied content, via the proxy server 14. The client-side pagelet injector 40 forwards a pagelet request to a pagelet injector handler 54 running on the proxy server 14. The pagelet injector 54 adjusts the request as needed and forwards it to a server-side retriever 56, which communicates with the remote server 16 to trigger fetching of the content 32 back to the proxy server 14.

Retrieved content 32 may be passed back through the retriever 56 and pagelet injection handler 54 to a server-side transformer 48 included in the proxy server markup handler 48. The server-side transformer 48 includes computer code for parsing retrieved content 32 and identifying URLs and other content, such as special fragments, and then marking any found static URLs (included within or outside of a script identified within HTML script tags) for rewriting, and applying a wrapper function around any link-generating scripts that produce or include dynamic URLs and content.

The server-side transformer 48 may forward the parsed content to a server-side URL rewriter 50 via the pagelet injection handler 54. Alternatively, the server-side transformer 48 communicates directly with the server-side URL rewriter 50. Alternatively, or in addition, URL rewriting operations are relegated to the client-side URL rewriter 42.

The server-side URL rewriter 50 includes computer code for rewriting marked static URLs in the parsed content from the server-side transformer 48, and returning the rewritten URLs to the pagelet injection handler 54 for forwarding to the client browser 12.

The client browser 12 forwards received parsed content (with rewritten URLs) relayed the pagelet injection handler 54 from the server-side transformer 48, or alternatively, from the server-side transformer 48, and then passes the parsed content to the client markup handler 22. The client markup handler 22 includes an optional client-side URL rewriter 42, which includes computer code for rewriting any static URLs marked by the server-side transformer 28 that have not been rewritten on the server side via the server-side URL rewriter 50.

Note that in certain implementations, the server-side URL rewriter 50 is reserved for rewriting URLs in response to requests from the client-side URL rewriter 42. In such implementations, parsed content from the server-side transformer 48 may be forwarded to the client browser 12 without first performing server-side URL rewriting via the server-side URL rewriter 50.

The client markup handler 22 further includes a dynamic content rewriter 44, which includes computer code for executing link-generating scripts in the received parsed content from the proxy server 14 in accordance with applied wrapper functions. The dynamic content rewriter 44 selectively invokes server-side functionality, e.g., the URL rewriter 50, to rewrite dynamically generated URLs output from any link-generating scripts contained in parsed markup received from the proxy server 14. The dynamic content rewriter 44 does this by calling a client-side transformer Representational State Transfer (REST) client 46 to facilitate rewriting dynamically generated content (identified by the server-side transformer 48) via the server-side URL rewriter 50.

The transformer REST client 46 includes computer code for employing a HyperText Transfer Protocol (HTT) POST method to send HTML markup to the proxy server 14 for URL rewriting. The client-side transformer REST client 46 communicates with the server-side URL rewriter 50 via an intermediate server-side transformer REST handler 52. The server-side transformer REST handler 52 may also communicate with the server-side transformer 48 to facilitate employing functionality thereof to facilitate transferring resulting rewritten dynamically generated URLs and related markup and content back to the client browser 12 for use by the web page retriever 18.

The web page retriever 18 may employ rewritten markup, including rewritten dynamically generated URLs, to access and display (or otherwise present) the proxied content 32 in a user interface of the client browser 12.

Figure 3:
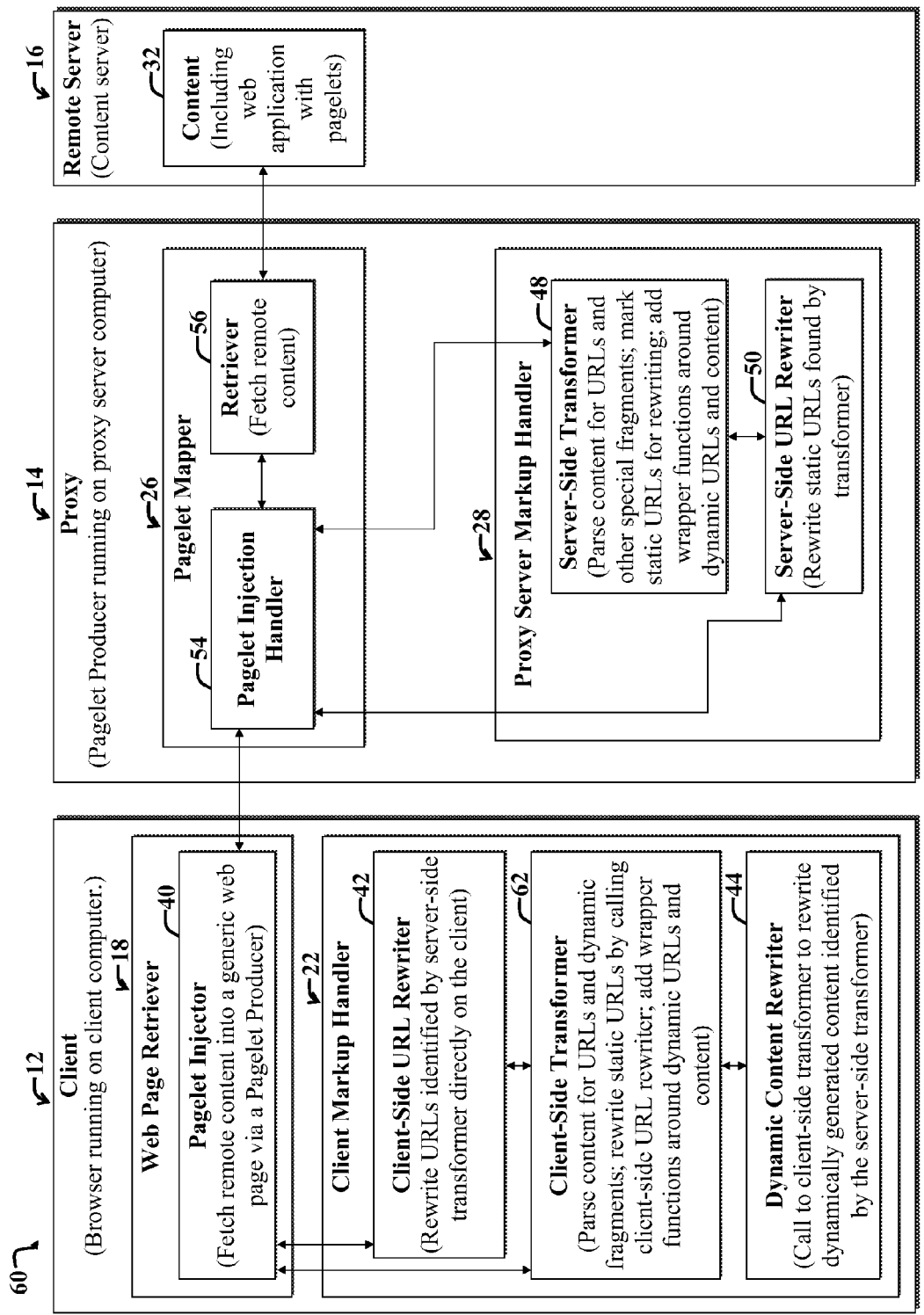
FIG. 3 is a more detailed diagram illustrating key functional blocks of a third example system employing client-side rewriting of dynamically generated URLs.

FIG. 3 is a more detailed diagram illustrating key functional blocks of a third example system 60 employing client-side rewriting of dynamically generated URLs. The second example system 40 represents a particular implementation of the system 10 of FIG. 1. The overall operation of the system 60 is similar to the overall operation of the system 10 of FIG. 1, but employs a second processing option (e.g., option 5b shown in FIG. 1). In the system 60 of FIG. 3, rewriting of dynamically generated URLs, which are generated via link-generating scripts running on the client browser 12, are not passed back to the proxy server 14 for rewriting, but instead are rewritten client side.

The construction of the system 60 of FIG. 3 is similar to the construction of the system 40 of FIG. 2 with the exception that the client markup handler 22 includes a client-side transformer 62, which includes computer code for parsing content for URLs and special fragments (e.g., dynamically generated fragments). In addition, the client-side dynamic content rewriter 46 need not communicate with the server-side URL rewriter 50; so the client-side transformer REST client 46 and server-side transformer REST handler 52 of FIG. 2 are omitted from FIG. 3. Instead, the client-side dynamic content rewriter 44 communicates with the client-side URL rewriter 42 and the client-side transformer 62 to facilitate applying any additional wrapper functions to received content as needed, and to facilitate rewriting dynamically generated links and related content (e.g., special fragments) that are output from link-generating scripts in the parsed content received from the server-side transformer 28 and/or received from the client-side transformer 62.

Content rewritten via the client markup handler 22, including dynamically generated URLs, may be provided to the web page retriever to facilitate employing the proxy server 14 to retrieve requested content from the remote server 16 and to display or otherwise present it via the client browser 12.

Figure 4:
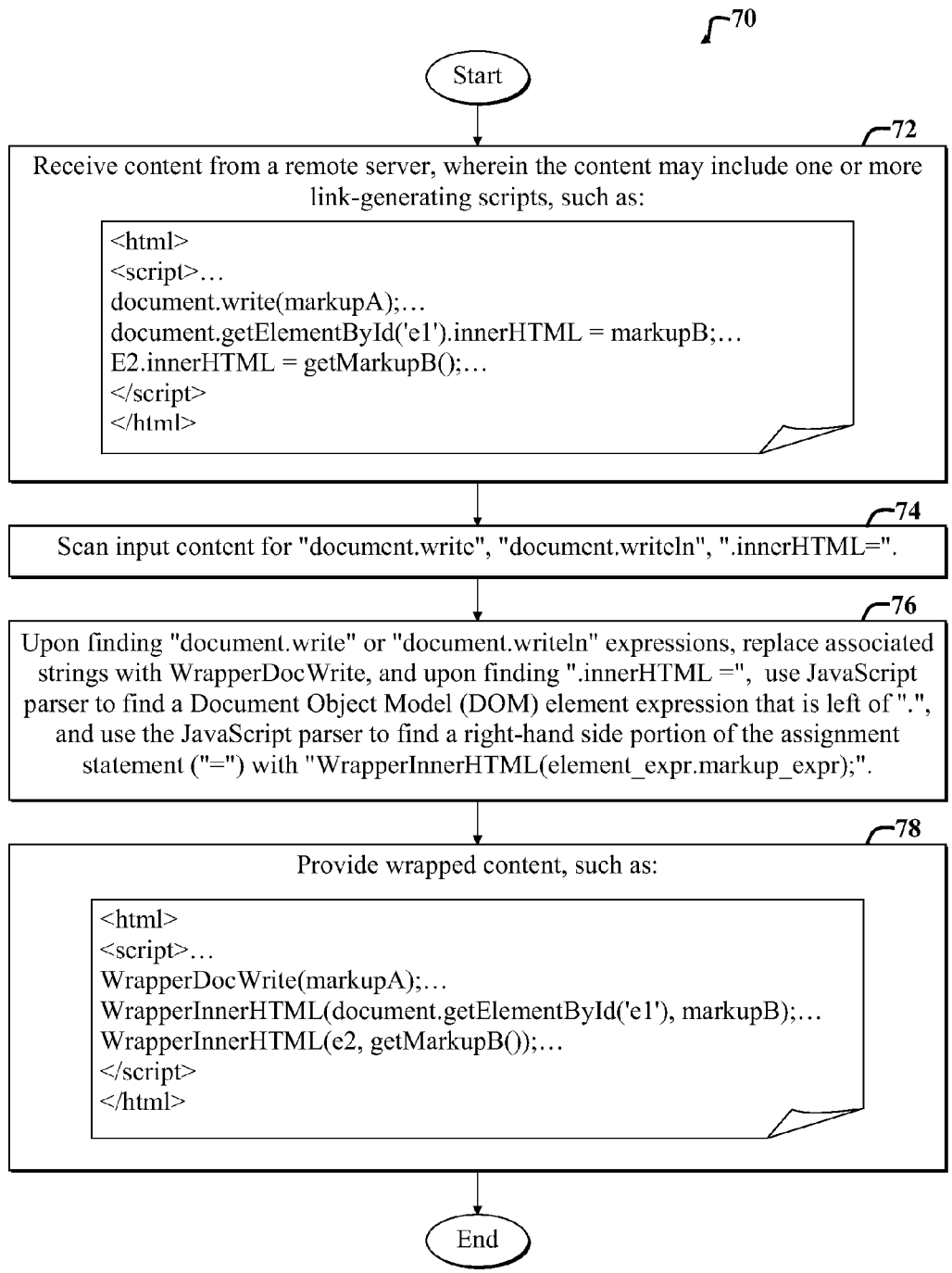
FIG. 4 is a flow diagram of a first example method for detecting and selectively applying a wrapper function to a link-generating script retrieved from the remote content server of FIGS. 1-3.

FIG. 4 is a flow diagram of a first example method 70 for detecting and selectively applying a wrapper function to a link-generating script retrieved from the remote content server 16 of FIGS. 1-3.

The second example method 70 includes an initial content-receiving step 72, which includes receiving proxied content 32, which includes one or more link-generating scripts or function calls, e.g., document.write(markupA) to be executed on a client browser.

A subsequent scanning step 74 includes scanning the received content for instances of JavaScript, such as "document.write", "document.writeln", and ".innerHTML=".

Next, upon finding JavaScript statements that include "document.write", "document.writeln", and/or "*.innerHTML=", the found statements are replaced, in a replacing step 76, with calls to a wrapper function component. For example, instances of ".innerHTML=" may be replaced with a call to a WrapperinnerHTML function. A JavaScript parser may be employed to find any HTML Document Object Model (DOM) element expressions left of "." and to find portions of the element expressions to the right of an assignment statement (e.g., to the right of "=" or within parenthesis "( . . . )"). Certain assignment statements are entirely replaced with calls to one or more wrapper function components, such as "WrapperInnerHTML(element_expr, markup_expr);".

After the replacing step 76, a providing step 78 outputs the resulting script (identified between the <script> and </script> tags shown in FIG. 4), which represents a wrapped script, i.e., a link-producing script to which a wrapper function has been applied. The wrapped script may be processed by the client markup handler 22 of FIGS. 2-3, and dynamically generated URLs output therefrom may be rewritten server side (e.g., via the system 40 of FIG. 2) and/or client side (e.g., via the system 60 of FIG. 2).

Example pseudo code for facilitating implementing the method 70 and associated wrapper function of FIG. 4 is as follows.

```
savedElems = { }; // map to hold DOM elements pending async
    transformation
nextElemId = 0; // simple unique element id generator
TRANSFORM_INTERVAL = 500; // timed transform interval (ms)
/**
* document.write wrapper
* @param markup
*/
function WrapperDocWrite(markup)
{
 // done via a synchronous request
 markup = transformMarkup(markup, pageletid, instanceid);
 document.write(markup);
}
/**
* innerHTML wrapper
* @param element
* @param markup
* @param async whether to perform rewriting asynchronously
*/
function WrapperInnerHTML(element, markup, async) {
 if (async) {
  // asynchronous rewriting
      // save element & markup into map
  var elemEntry = { };
  elemEntry.element = element;
  elemEntry.markup = markup;
  elemEntry.status = "not_submitted";
  savedElems[nextElemId++] = elemEntry;
  if (!timer) {
      // set timer, if hasn't been set yet
   timer = window.setTimeout(asyncTransform,
```

-continued

```
    TRANSFORM_INTERVAL);
 }
} else {
 // synchronous rewriting
 element.innerHTML = transformMarkup(markup);
 }
}
/**
* Triggered by a timer, this function submits markup fragments from the
* global map for server transformation.
*/
function asyncTransform( ) {
// go through map of saved elements
// if element hasn't been submitted, add it to the POST data and mark as
// submitted submit an asynchronous POST to the REST transformer
delete timer;
var savedElems = savedElems;
var elemsToSubmit = getElementsWithNonSubmittedStatus( );
var request = openAsynchronousTransformRequest( );
request.onreadystatechange = function( ) {
    // callback function:
    // go through returned elements
    // lookup each saved element by generated id and set its
    // innerHTML with returned markup
    for (returnedElement in returnedArray) {
        var id = returnedElement.id;
            savedElems[id].innerHTML = returnedElement.markup;
    }
}
// send request
request.send(elemsToSubmit);
}
/**
* Synchronous call to transform HTML markup
* @param markup
* @return transformed markup
*/
function transformMarkup(markup)
{
 if (usingClientSideTransformer) markup =
 transformMarkupLocally(markup);
 else markup = synchronousAjaxTransformRequest(markup);
 return markup;
}
```

Exact details pertaining to identifying portions of content to be wrapped, and wrapper function details are implementation specific and may vary. Those skilled in the art with access to the present teachings may readily determine how to implement a wrapper function to meet the needs of a given implementation without undue experimentation.

Figure 5:
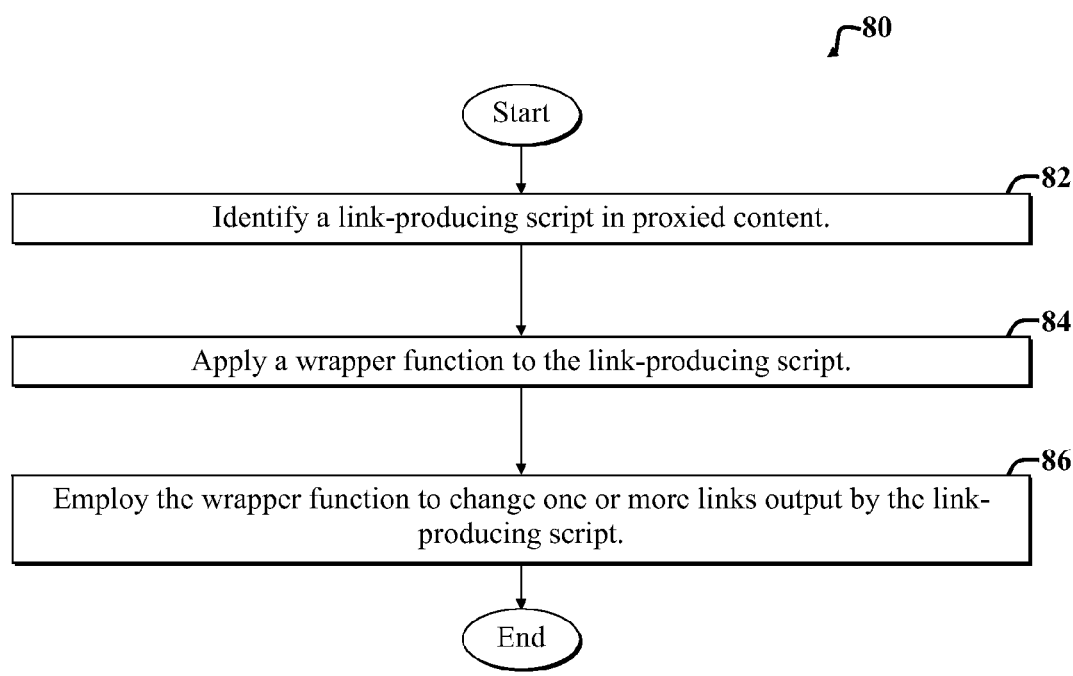
FIG. 5 is a flow diagram of a generalized second example method for selectively changing links derived from proxied content to facilitate proxy operations, wherein the second example method is adapted for use with the embodiments of FIGS. 1-3.

FIG. 5 is a flow diagram of a generalized second example method 80 for selectively changing links derived from proxied content to facilitate proxy operations, wherein the second example method 70 is adapted for use with the embodiments of FIGS. 1-3. The method 80 includes a first step 82, which involves identifying a link-producing script in proxied content.

A second step 84 includes applying a wrapper function to the link-producing script. A third step 86 includes employing the wrapper function to change one or more links output by the link-producing script.

Note that the method 80 may be augmented or altered without departing from the scope of the present teachings. Examples of possible additional steps include receiving a request for proxied content, such as a pagelet, from a client browser; and mapping the request to a URL associated with a content server; retrieving markup (from the content server) corresponding to proxied content identified via the request; transforming the markup in accordance with rules specified via the proxy server; and providing transformed markup to the client browser. The rules specified by the proxy server may be incorporated in the applied wrapper function.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A method, performed at a proxy server, for changing a link dynamically generated by a link producing script included in requested content provided to the proxy server by a content server, with the requested content including HyperText Markup Language (HTML) markup, the method comprising:

receiving, at the proxy server, a proxied content request from a client computer, with the client computer utilizing a proxied content request that requests content from a content server via the proxy server, with the requested content identified by a content uniform resource locator (URL), where the proxied content request is written relative to the proxy server and includes a proxy URL that identifies the proxy server and content name information that identifies the content URL;

mapping, by the proxy server, the content name information included in the proxied content request to the content URL;

retrieving, by the proxy server, the requested content by utilizing the content URL;

scanning, by the proxy server, retrieved requested content to detect the presence of a link producing script including a document write script statement that inserts a dynamically generated URL into the retrieved requested content when the document write script statement is executed, where the dynamically generated URL is not present in the retrieved requested content returned to the proxy server;

replacing, by the proxy server, the document write script statement with a call to a wrapper function, where the wrapper function, when called, rewrites the dynamically generated URL relative to the proxy server; and forwarding, by the proxy server, wrapped retrieved requested proxied content to the client computer.

2. The method of claim 1 wherein the link producing script is implemented via JavaScript, and wherein one or more links output via the link producing script include one or more Uniform Resource Locators (URLs).

3. The method of claim 2 wherein the document write script statement is a JavaScript document.write( . . . ) statement.

4. The method of claim 2 wherein the document write script statement is a JavaScript innerHTML statement.

5. The method of claim 1 wherein the requested content includes a pagelet.

6. The method of claim 1 further including: retrieving HTML markup corresponding to requested content identified via the request; transforming the markup in accordance with rules specified via the proxy server; and providing transformed markup to the client computer.

7. The method of claim 1 further including:

rewriting, by the proxy server, a dynamically generated URL generated when the client computer executes the captured content-inserting script and sent by the client to the proxy server employing an HTTP Post method; and transferring, by the proxy server, a rewritten dynamically generated URL back to the client computer.

8. The method of claim 1 wherein the wrapper function includes a call to computer code included in a code library specified via the wrapper function.

9. A proxy server comprising:

a digital processor coupled to a non-transitory computer readable storage medium, wherein the proxy server receives a proxied content request from a client computer, with the requested content including HyperText Markup Language (HTML) markup, with the client computer utilizing a proxied content request that requests content from a content server via the proxy server, with the requested content identified by a content uniform resource locator (URL), where the proxied content request is written relative to the proxy server and includes a proxy URL that identifies the proxy server and content name information that identifies the content URL and wherein the non-transitory computer readable storage medium includes one or more instructions executable by the digital processor to perform the following acts to change a link dynamically generated by a link producing script included in requested content provided to the proxy server by a content server:

mapping the content name information included in the proxied content request to the content URL;

retrieving the requested content by utilizing the content URL;

scanning retrieved requested content to detect the presence of a link producing script including a document write script statement that inserts a dynamically generated URL into the retrieved requested content when the document write script statement is executed, where the dynamically generated URL is not present in the retrieved requested content returned to the proxy server;

replacing the document write script statement with a call to a wrapper function, where the wrapper function, when called, rewrites the dynamically generated URL relative to the proxy server; and forwarding wrapped retrieved requested proxied content to the client computer.

10. A non-transitory computer readable storage medium including instructions executable by a proxy server including a digital processor to change a link dynamically generated by a link producing script included in requested content provided to the proxy server by a content server, wherein the proxy server receives a proxied content request from a client computer, with the client computer utilizing a proxied content request that requests content from a content server via the proxy server, with the requested content identified by a content uniform resource locator (URL), where the proxied content request is written relative to the proxy server and includes a proxy URL that identifies the proxy server and content name information that identifies the content URL, and wherein the non-transitory computer readable storage medium includes one or more instructions for:

mapping the content name information included in the proxied content request to the content URL;

retrieving the requested content by utilizing the content URL;

scanning retrieved requested content to detect the presence of a link producing script including a document write script statement that inserts a dynamically generated URL into the retrieved requested content when the document write script statement is executed, where the dynamically generated URL is not present in the retrieved requested content returned to the proxy server;

replacing the document write script statement with a call to a wrapper function, where the wrapper function, when called, rewrites the dynamically generated URL relative to the proxy server; and forwarding the wrapped retrieved requested proxied content to the client computer.

* * * * *

UNITED STATES PATENT AND TRADEMARK OFFICE
CERTIFICATE OF CORRECTION

PATENT NO. : 9,460,222 B2  
APPLICATION NO. : 13/474709  
DATED : October 4, 2016  
INVENTOR(S) : Gutkin et al.

Page 1 of 1

It is certified that error appears in the above-identified patent and that said Letters Patent is hereby corrected as shown below:

In the Specification

In Column 8, Line 13, delete "(HTT)" and insert -- (HTTP) --, therefor.

In Column 9, Line 18, delete "WrapperinnerHTML" and insert -- WrapperInnerHTML --, therefor.

In the Claims

In Column 14, Line 25, in Claim 10, after "forwarding" delete "the".

Signed and Sealed this  
Twelfth Day of September, 2017

Joseph Matal  
*Performing the Functions and Duties of the*  
*Under Secretary of Commerce for Intellectual Property and*  
*Director of the United States Patent and Trademark Office*